(12) United States Patent
Lackner et al.

(10) Patent No.: US 12,070,717 B2
(45) Date of Patent: Aug. 27, 2024

(54) DEVICE, SYSTEM, AND METHOD FOR PASSIVE COLLECTION OF ATMOSPHERIC CARBON DIOXIDE

(71) Applicant: ARIZONA BOARD OF REGENTS ON BEHALF OF ARIZONA STATE UNIVERSITY, Scottsdale, AZ (US)

(72) Inventors: Klaus Lackner, Paradise Valley, AZ (US); Shreyans Kedia, Tempe, AZ (US); Venkatram Choodamani, Tempe, AZ (US); Robert Page, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 602 days.

(21) Appl. No.: 17/288,481

(22) PCT Filed: Oct. 28, 2019

(86) PCT No.: PCT/US2019/058408
§ 371 (c)(1),
(2) Date: Apr. 23, 2021

(87) PCT Pub. No.: WO2020/092272
PCT Pub. Date: May 7, 2020

(65) Prior Publication Data
US 2021/0387133 A1 Dec. 16, 2021

Related U.S. Application Data

(60) Provisional application No. 62/828,367, filed on Apr. 2, 2019, provisional application No. 62/752,319, filed on Oct. 29, 2018.

(51) Int. Cl.
*B01D 53/04* (2006.01)

(52) U.S. Cl.
CPC ..... *B01D 53/0438* (2013.01); *B01D 53/0454* (2013.01); *B01D 2253/34* (2013.01); *B01D 2257/504* (2013.01); *B01D 2259/4009* (2013.01)

(58) Field of Classification Search
None
See application file for complete search history.

(56) References Cited

U.S. PATENT DOCUMENTS

| | | |
|---|---|---|
| 4,046,525 A | 9/1977 | Matsuo |
| 4,801,308 A | 1/1989 | Keefer et al. |

(Continued)

FOREIGN PATENT DOCUMENTS

| | | |
|---|---|---|
| AU | 2014255974 A1 | 11/2015 |
| CN | 202021005 U | 11/2011 |

(Continued)

OTHER PUBLICATIONS

Lackner, Klaus, "Capture of carbon dioxide from ambient air", The European Physical Journal Special Topics, 176:93-106 (2009).

(Continued)

*Primary Examiner* — Jason M Greene
(74) *Attorney, Agent, or Firm* — BOOTH UDALL FULLER, PLC

(57) ABSTRACT

A device for passive collection of atmospheric carbon dioxide is disclosed. The device includes a release chamber having an opening and a sorbent regeneration system. The device also includes a capture structure coupled to the release chamber, having at least one collapsible support and a plurality of tiles spaced along the collapsible support. Each tile has a sorbent material. The capture structure is movable between a collection configuration and a release configuration. The collection configuration includes the capture structure extending upward from the release chamber to expose (Continued)

the capture structure to an airflow and allow the sorbent material to capture atmospheric carbon dioxide. The release configuration includes the collapsible support being collapsed and the plurality of tiles being sufficiently enclosed inside the release chamber that the sorbent regeneration system may operate on the plurality of tiles to release captured carbon dioxide from the sorbent material and form an enriched gas.

20 Claims, 8 Drawing Sheets

(56) References Cited

U.S. PATENT DOCUMENTS

| | | | |
|---|---|---|---|
| 7,909,911 | B2 | 3/2011 | Lackner et al. |
| 7,947,239 | B2 | 5/2011 | Lackner et al. |
| 8,088,197 | B2 | 1/2012 | Wright et al. |
| 8,518,357 | B2 | 8/2013 | Lackner et al. |
| 8,715,393 | B2 | 5/2014 | Wright et al. |
| 11,478,745 | B2 | 10/2022 | Lackner |
| 2011/0189075 | A1* | 8/2011 | Wright ............... B01D 53/0423 502/55 |
| 2014/0356275 | A1 | 12/2014 | Lackner |
| 2015/0004084 | A1 | 1/2015 | Goldberg |
| 2015/0020683 | A1 | 1/2015 | Wright et al. |
| 2015/0103401 | A1 | 4/2015 | Park |
| 2015/0336044 | A1 | 11/2015 | Keith, II |
| 2016/0074803 | A1* | 3/2016 | Gebald ............... B01D 53/0438 95/139 |
| 2018/0169562 | A1 | 6/2018 | Hilbig et al. |

FOREIGN PATENT DOCUMENTS

| | | |
|---|---|---|
| CN | 103079671 A | 5/2013 |
| CN | 103501891 A | 1/2014 |
| CN | 105163830 A | 12/2015 |
| JP | 6097019 B2 | 5/1985 |
| WO | 2015/103401 A1 | 7/2015 |
| WO | 2015103401 | 7/2015 |

OTHER PUBLICATIONS

Zheng, M., Meinrenken, C. J., & Lackner, K. S. (2015). Smart households: Dispatch strategies and economic analysis of distributed energy storage for residential peak shaving. Applied Energy, 147, 246-257.

Meinrenken, C. J., & Lackner, K. S. (2014). Options to dissociate CO2 and H20 for sustainable sunlight-to-fuel pathways: Comparative assessment of current R&D hurdles and future potential. Journal of Natural Sciences, 2(2), 19-54.

Lackner, K. S., Brennan, S., Matter, J. M., Park, A. H. A., Wright, A., & Van Der Zwaan, B. (2012). The urgency of the development of CO2 capture from ambient air. Proceedings of the National Academy of Sciences, 109(33), 13156-13162.

Dahlgren, Eric, Caner Gocmen, Klaus Lackner, and Garrett van Ryzin. "Small modular infrastructure." The Engineering Economist 58, No. 4 (2013): 231-264 (Abstract only).

Graves, Christopher, et al. "Sustainable hydrocarbon fuels by recycling CO2 and H2O with renewable or nuclear energy." Renewable and Sustainable Energy Reviews 15:1-23 (2011).

Lackner, K. S., Wendt, C. H. (1995). Exponential Growth of Large Self-Reproducing Machine Systems. Mathematical and Computer Modelling, 21(10):55-81.

Lackner, K. S., Ziock, H.J. and Grimes, P. "Carbon Dioxide Extraction from Air: Is it an Option?" Proceedings of the 24th International Conference on Coal Utilization & Fuel Systems. Clearwater, Florida, Mar. 8-11, 1999. pp. 885-896.

Goldberg, D., & Lackner, K. (2015). Creating negative emissions at remote CO2 sequestration sites. Greenhouse Gases: Science and Technology, 5:238-240.

Krevor, S. C., & Lackner, K. S. (2011). Enhancing serpentine dissolution kinetics for mineral carbon dioxide sequestration. International Journal of Greenhouse Gas Control, 5(4):1073-1080.

* cited by examiner

DEVICE, SYSTEM, AND METHOD FOR PASSIVE COLLECTION OF ATMOSPHERIC CARBON DIOXIDE

RELATED APPLICATIONS

This application is the U.S. National Stage of International Application No. PCT/US2019/058408, filed Oct. 28, 2019, which claims the benefit of U.S. provisional patent application No. 62/752,319, filed Oct. 29, 2018 titled "Device, System, and Method for Direct Air Capture," and also claims the benefit of U.S. provisional patent application No. 62/828,367, filed Apr. 2, 2019 titled "Device, System, and Method for Passive Air Capture of $CO_2$," the contents of each of which are hereby incorporated by reference in their entireties.

TECHNICAL FIELD

Aspects of this document relate generally to the passive collection of atmospheric carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost.

SUMMARY

According to one aspect, a device for passive collection of atmospheric carbon dioxide includes a release chamber having an opening and a sorbent regeneration system. The device also includes a capture structure coupled to the release chamber and having at least one collapsible support and a plurality of tiles coupled to and spaced along the at least one collapsible support. Each tile has a sorbent material, and the capture structure is movable between a collection configuration and a release configuration. The device also includes a lid covering the opening of the release chamber when the capture structure is in the release configuration, and a product outlet in fluid communication with the inside of the release chamber and configured to receive a product stream of enriched gas. The collection configuration includes the capture structure extending upward from the release chamber to expose at least a portion of the capture structure to an airflow and allow the sorbent material of the plurality of tiles to capture atmospheric carbon dioxide. The release configuration includes the at least one collapsible support of the capture structure being collapsed, the lid covering the opening of the release chamber, and the plurality of tiles being sufficiently enclosed inside the release chamber that the sorbent regeneration system may operate on the plurality of tiles to release captured carbon dioxide from the sorbent material and form an enriched gas within the release chamber.

Particular embodiments may comprise one or more of the following features. The sorbent material may be a moisture swing sorbent material, the sorbent regeneration system may include a release medium, and a release medium emitter. The release medium may be one of liquid water and steam. The sorbent material may be a heat swing sorbent material and the sorbent regeneration system may include a heat source. The heat source may be a release medium emitter configured to release steam. The release chamber may further include a sweep gas inlet coupled to a sweep gas source and may be configured to introduce a sweep gas to the release chamber to displace the enriched gas. The sweep gas may be steam. Each tile of the plurality of tiles may be substantially planar. For each tile of the plurality of tiles, the sorbent material may include a plurality of sorbent surfaces coupled to a surface of the tile at an angle greater than zero. Each tile of the plurality of tiles may include an aperture. Each tile of the plurality of tiles may include an upper frame and a lower frame, with the sorbent material sandwiched between the upper frame and lower frame. The device may also include an actuator coupled to the capture structure, and/or a control system communicatively coupled to the actuator and configured to drive the actuator to move the capture structure between the collection configuration and the release configuration. The device may further include at least one sensor communicatively coupled to the control system. The control system may be configured to determine at least one ambient condition based on signals received from the at least one sensor, and autonomously drive the actuator to move the capture structure between the collection configuration and the release configuration based upon the at least one ambient condition. The at least one ambient condition may include at least one of a temperature, a humidity, and/or a wind speed. Finally, the device may further include at least one baffle.

According to another aspect of the disclosure, a method for passive collection of atmospheric carbon dioxide includes preparing a passive collection device having a release chamber and a capture structure to collect atmospheric carbon dioxide by moving the capture structure into a collection configuration with an actuator driven by a control system. The capture structure includes at least one collapsible support and a plurality of tiles coupled to and spaced along the at least one collapsible support, each tile having a sorbent material. The collection configuration includes the capture structure extending upward from the release chamber. The method also includes exposing at least a portion of the capture structure to an airflow to allow the sorbent material of the plurality of tiles to capture atmospheric carbon dioxide, as well as placing the capture structure in a release configuration by driving the actuator to lower the capture structure into the release chamber such that the at least one collapsible support collapses and the plurality of tiles is entirely inside of the release chamber. The method additionally includes closing the release chamber with a lid, confining the plurality of tiles inside the release chamber, and regenerating the sorbent material of the plurality of tiles by operating on the sorbent material with a sorbent regeneration system to release the captured carbon dioxide, forming an enriched gas within the release chamber. Finally, the method includes emitting a product stream of enriched gas through a product outlet in fluid communication with the inside of the release chamber by displacing the enriched gas with a sweep gas introduced to the release chamber.

Particular embodiments may comprise one or more of the following features. The sorbent material may be a moisture swing sorbent material, the sorbent regeneration system may include a release medium, and a release medium emitter. The release medium may be one of liquid water and steam. The sorbent material may be a heat swing sorbent material and the sorbent regeneration system may include a heat source. The heat source may be a release medium emitter configured to release steam. The method may also include determining at least one ambient condition local to the passive collection device based on a signal received from at least one sensor communicatively coupled to the control system, and/or determining an optimal exposure time for the capture structure based on the at least one ambient condition. The sweep gas may be one of air, nitrogen, water vapor, and steam.

According to yet another aspect of the disclosure, a system for passive collection of atmospheric carbon dioxide includes at least one passive collection cluster, each passive collection cluster having at least two passive collection devices. Each passive collection device includes a release chamber having an opening and a sorbent regeneration system. Each device also includes a capture structure coupled to the release chamber and comprising at least one collapsible support and a plurality of tiles coupled to and spaced along the at least one collapsible support. Each tile includes a sorbent material. The capture structure is movable between a collection configuration and a release configuration. Each device also includes a lid covering the opening of the release chamber when the capture structure is in the release configuration. Each device also includes an actuator coupled to the capture structure, and a product outlet in fluid communication with the inside of the release chamber and configured to receive a product stream of enriched gas. The system further includes a control system communicatively coupled to each passive collection cluster and configured to drive the actuator to move the capture structure of at least one passive collection device between the collection configuration and the release configuration. The product outlet of each passive collection device within the same cluster is in fluid communication. For each passive collection device, the collection configuration includes the capture structure extending upward from the release chamber to expose at least a portion of the capture structure to an airflow and allow the sorbent material of the plurality of tiles to capture atmospheric carbon dioxide. For each passive collection device, the release configuration includes the at least one collapsible support of the capture structure being collapsed, the lid covering the opening of the release chamber, and the plurality of tiles being sufficiently enclosed inside the release chamber that the sorbent regeneration system may operate on the plurality of tiles to release captured carbon dioxide from the sorbent material and form an enriched gas within the release chamber.

Particular embodiments may comprise one or more of the following features. The at least two passive collection devices of each cluster may share the same actuator. The release chamber of each passive collection device in the same cluster may be in fluid communication, such that the enriched gas of one collection device may be swept through the release chamber of a neighboring collection device. The system may further include at least one sensor communicatively coupled to the control system. The control system may be configured to determine at least one ambient condition based on signals received from the at least one sensor, and autonomously drive at least one actuator to move at least one capture structure between the collection configuration and the release configuration based upon the at least one ambient condition. The at least one ambient condition may include at least one of a temperature, a humidity, and a wind speed. The control system may be configured to operate the passive collection devices in series to produce a continuous product stream of enriched gas.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
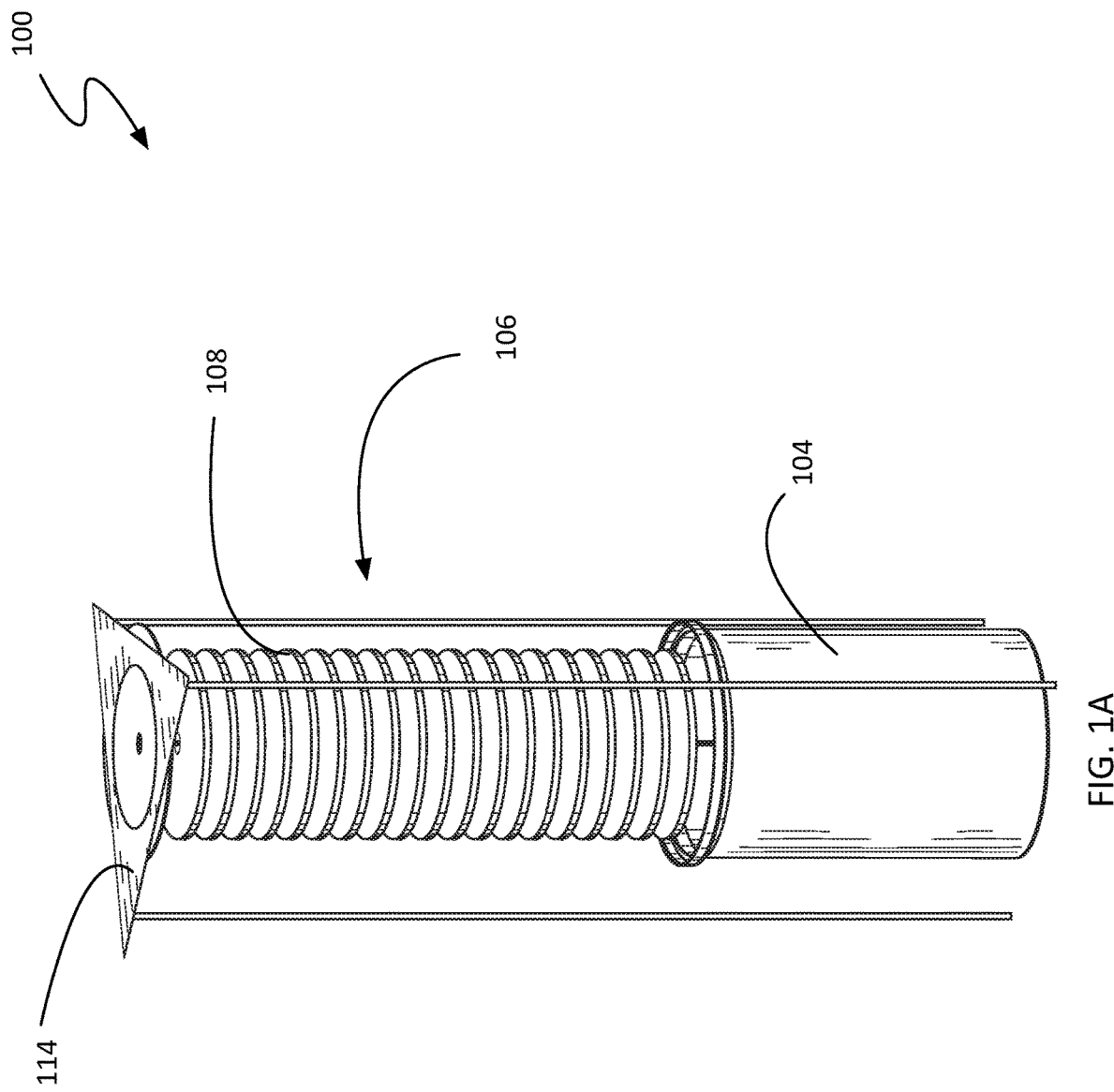
FIGS. 1A and 1B are perspective and side views of a device for passive collection of atmospheric carbon dioxide.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. Nevertheless, the technologies are still new and the early air capture processes require large amounts of energy to operate. Because $CO_2$ in the air is very dilute (400 parts per million by volume), $CO_2$ collectors must not invest a significant amount of energy to draw in bulk air. Heating or cooling the air, drying the air, or significantly changing the air pressure would exceed any reasonable energy budget. Furthermore, conventional collection systems tend to exhibit the unfortunate combination of being costly and fragile. Conventional capture devices often have a large initial capital cost along with a high operating cost. Furthermore, conventional capture devices are sometimes better suited to a particular environment while being ineffective in others.

Contemplated herein are devices, systems, and methods for the passive collection of atmospheric carbon dioxide from natural air flow or wind, while employing a simplified design that is durable, energy efficient, and capable of being adapted for use in various conditions and with a variety of sorbent materials, including materials sensitive to a vacuum, thermal and/or moisture swing, individually or in combination. In some embodiments, these devices may be organized into clusters and systems, and may provide continuous capture of $CO_2$, as well as supply a continuous stream of $CO_2$ enriched gas, as will be discussed in greater detail, below. In other embodiments, these devices might be installed and operated as individual units. Additionally, in some embodiments, some of the devices, systems, and methods contemplated herein may be implemented autonomously or semi-autonomously, adjusting for changing environmental conditions to improve efficacy and efficiency.

Figure 1B:
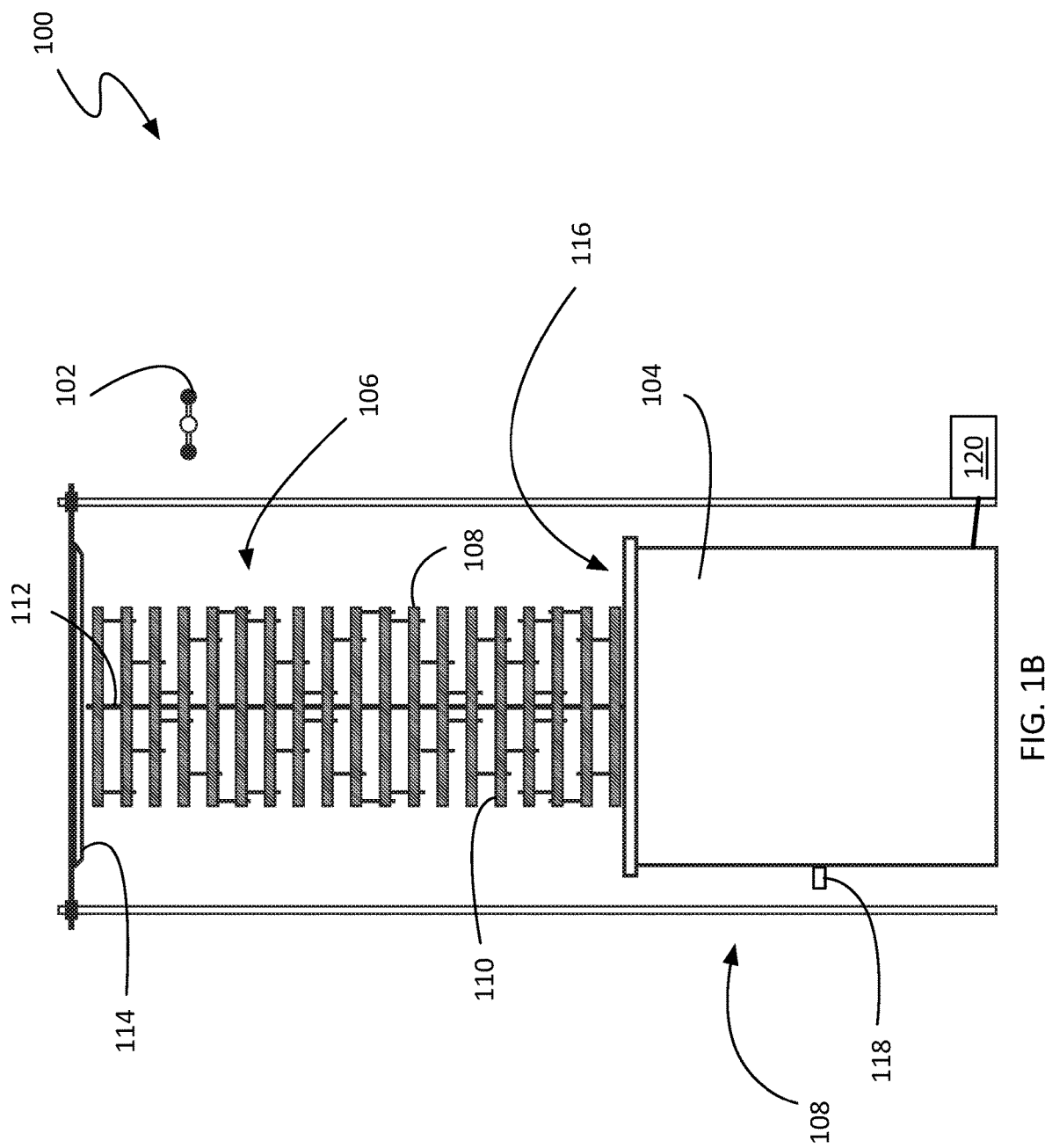

FIGS. 1A and 1B are perspective and side views of a non-limiting example of a device 100 for passive collection of atmospheric carbon dioxide 102 (hereinafter "passive collection device", "collection device", or just "device"). Specifically, FIG. 1A is a perspective view, and FIG. 1B is a side view.

According to various embodiments, the collection device 100 comprises a capture structure 106 configured to expose a sorbent material 110 to ambient air, a release chamber 104 (or regeneration chamber) into which the capture structure 106 may be placed through an opening 116, a lid 114 to seal or otherwise enclose the capture structure 106 inside the release chamber 104, a means of introducing heat and/or moisture to the release chamber 104 (either separately or in unison) to regenerate the sorbent material 110 and release the captured $CO_2$, and a means of extracting the $CO_2$ enriched gas from within the chamber through a product outlet 118.

In the context of the present description and the claims that follow, a release chamber 104 is an enclosure within which captured carbon dioxide is released for subsequent sequestration, refinement, or application. The release chamber 104 has at least one opening, opening 116, through which it receives captured carbon dioxide and the material in which it is captured (e.g. the capture structure 106 and its sorbent material 110, etc.).

The release chamber 104 may be constructed of a durable material appropriate for both the external environment in which the collection device 100 is being employed, as well as the internal environment inherent to its operation (e.g. the nature of the sorbent regeneration system 306, etc.).

According to various embodiments, the release chamber 104 comprises all the necessary equipment or structure to accomplish the regeneration of the sorbent material used to collect carbon dioxide, which may include (but is not limited to) some or all of the following steps: introducing to the chamber a liquid, draining liquid from the chamber, pushing sweep gas through the chamber, evacuating the chamber, heating the chamber, injecting steam or water droplets into the chamber. For example, some embodiments may comprise a plumbing support structure that makes it possible to introduce to, and remove from, the release chamber 104 heat, gases, liquids, etc., as are necessary to perform the regeneration task. Regeneration of the capture structure 106 will be discussed in greater detail with respect to FIG. 3B, below.

In some embodiments, the release chamber 104 comprises an internal flow system comprising fans or blowers to create a recirculating air flow. In other embodiments, the release chamber 104 may comprise a gas recirculation system, where the flow inside the chamber 104 is driven by a gas being pumped into the chamber 104 and returned to an external recirculation system. In passive collection systems and/or clusters, which will be discussed below with respect to FIG. 4, multiple collection devices 100 may share a single gas recirculation system, or may employ a shared system in conjunction with individual internal systems.

In the context of the present description and the claims that follow, the capture structure 106 is the structure or collection of structures upon which, or in which, the atmospheric $CO_2$ is captured. As shown, the capture structure 106 is made up of a plurality of tiles 108 coupled to and spaced along one or more collapsible supports 112. The tiles 108 comprise one or more sorbent materials 110 responsible for the capture of carbon dioxide. Sorbent materials 110 will be discussed further, below. In some embodiments, the sorbent material 110 may be disposed on one or more surfaces of a tile 108, while in other embodiments, the 108 itself may be made of sorbent material 110. As will be discussed, the sorbent material 110 releases captured $CO_2$ when it is regenerated (e.g. upon application of a sorbent regeneration system 306 inside the release chamber 104, etc.).

As shown, when the capture structure 106 is "deployed", exposed to the atmosphere to collect carbon dioxide, the tiles 108 are suspended along one or more collapsible supports 112 such that air may flow between the tiles 108 from any direction. Such an arrangement is advantageous when used to capture $CO_2$ from natural air flow and wind, which may shift in direction. Furthermore, while the tile-based structures contemplated herein are described in the context of use in a passive air flow, it should be understood that they may also be used with a driven air flow as well.

The non-limiting example shown in FIGS. 1A and 1B is tall and cylindrical and makes use of circular tiles. In some embodiments, the device and/or the tiles 108 may have a roughly circular cross-section, which may be advantageous for use in passive air capture in conditions where the air flow could come from any direction. In other embodiments, the device and/or tiles 108 may have a non-circular cross-section. Various tile 108 shapes will be discussed in greater detail below with respect to FIGS. 2AB and C.

As shown, the capture structure 106 may comprise a stack of tiles 108. According to various embodiments, the capture structure 106 stack could range from a few (5 to 10) tiles 108, to a large number (>1000). Particular embodiments make use of stacks between 50 and 200 tiles.

Tiles 108 are supported by one or more collapsible supports 112 that, when raised, allows them to hang down freely, under gravity, so that air can pass through the gaps between them. In many embodiments, the tiles 108 rest on each other when the capture structure 106 is collapsed inside the release chamber 104, using small raisers to maintain a small gap between the tiles 108 when they are at rest within the chamber 104.

In addition to collecting atmospheric carbon dioxide, the capture structure 106 is able to move between an arrangement suitable for collecting the atmospheric carbon dioxide (e.g. a collection configuration), and an arrangement allowing the captured $CO_2$ to be released into the release chamber 104 (e.g. a release configuration). The collection and release configurations will be discussed with respect to FIGS. 3A and 3B, below.

As previously mentioned, the tiles 108 are coupled to, and spaced along, one or more collapsible supports 112. For example, FIGS. 1A and 1B show a non-limiting example having a single collapsible support 112 running through the central axis of the tiles 108. Examples of the collapsible support 112 include, but are not limited to, thin ropes, lines, or chains. In one embodiment, each tile 108 may be connected to the one above, and thereby carries the weight of all the tiles 108 below it. In another embodiment, the collapsible support 112 is continuous, and designed to carry all the weight of the tiles 108, whereas the tile 108 structure is designed to only carry its own weight. To give a specific example of such a support system, consider a plurality of narrow, long ladders formed by long strings or chains, with solid rods for rungs. These ladders may be narrow, e.g., 1 cm wide, or could be many centimeters wide. With a minimum of three such ladders arranged evenly around the edge of the tiles 108, each tile 108 could be hooked onto a single rung. The ladder structure would support the weight of all the tiles 108, while the individual tiles 108 would only have to support their own weight. By increasing the number of ladders, the thickness of the lines comprising the sides of the ladders can be made thinner, making it easier to collapse the ladder. Advantageously, if the number of ladders is larger than three it is possible to remove and replace a single ladder during maintenance while the capture structure 106 is in the open/collection configuration.

In another embodiment, the tiles 108 may be held up by telescoping tubes or rigid rods that fold in zig-zag pattern tangential to the tiles 108, creating "Dog-bone" shapes that protrude from the bottom tile 108 into an open space in the tiles 108 above. In this design it may be necessary to have consecutive tiles 108 anchored at different locations shifted by a few degrees to make room for the length of the dog-bone to not interfere with that of the tile 108 above.

In yet another embodiment, the collapsible support 112 may be a conical shape surrounding a hole in the center of the tile 108. When stacked, the tiles 108 rest on each other and extend their distance as cones move slight apart. Such a design would naturally help with the self-centering of the tiles 108 as they become stacked. If the cones are truncated and therefore open at the top, they would generate a vertical, open channel through the middle of the collapsed tile 108 stack, which could help in guiding air flows during regeneration of the tiles 108. Those skilled in the art will recognize other collapsible configurations exist.

According to various embodiments, the tiles 108 of a collection device 100 are separated from each other when in a collection configuration or phase, and are stacked on top of each other in a regeneration or release phase. As an option, the sensitive portions of the tiles 108 may be protected from contacting other tiles 108 by a buffer structure, such as a pad or rim. Buffering might be structured in such a manner as to help direct air flows to enhance collection and/or harvest.

It may be advantageous to limit the motion of the stack of tiles 108 when hanging freely (e.g. to prevent damage, optimize sorbent exposure, etc.). One way of limiting the motion is to contain the hanging stack between guides as it is lifted up. One example would be a set of vertical poles, which may also give structural support to the lifting structure. Three such poles would already be sufficient to constrain the sideways motion of the tiles 108. Another embodiment may have the tiles 108 connected through guides along a center hole, that prevents relative motions of the tiles 108. If the tiles 108 and the lid 114 are ring shaped, then guides could also run on the inside of the tiles 108. Another option for limiting movement of the tile 108 is to tether the bottom tile 108 to the bottom of the release chamber 104.

According to various embodiments, the tiles 108 may be coupled to the bottom of the lid 114, and the lid 114 is pulled up with the tiles 108 as the device 100 is opening up to a collection configuration. In other embodiments, the lid 114 may open sideways, either by sliding or by hinging like a door. The lifting mechanism would then couple to a fixture on the top of the capture structure 106 in order to lift it up without the lid 114. Such a design would be of particular interest in a cluster of collection devices 100 where the lifting mechanism could be shared among multiple devices 100. As an option, the capture structure 106 may be attached to some form of support structure once it has been fully lifted.

According to various embodiments, the passive collection device 100 can be used with a wide range of sorbent materials 110 that can be regenerated by various means, including solid sorbents and liquid sorbents. The sorbents can be made from inorganic materials or from organic materials, and could also be composites. Sorbents could be materials that bind $CO_2$ chemically or physically, i.e., they could be absorbers. They also could be adsorbents that bind $CO_2$ on internal surfaces, for example inside porous structures, or on fiber surfaces. Sorbents can be regenerated in a moisture swing, thermal swing, a vacuum swing, or in a combination of these approaches. The above discussion of different sorbents is meant to exemplify the options, rather than provide an exhaustive description. Other sorbent-based technologies that can be provided by those skilled in the art may be adapted for use in the device 100.

In one embodiment, a passive collection device 100 may employ a sorbent material 110 that can be regenerated with a liquid wash that carries away the $CO_2$ from the release chamber 104 as part of the liquid wash. The liquid could outgas its $CO_2$ inside the release chamber 104, or the liquid could be transported outside the release chamber 104 where it would be subject to further processing in order to release the $CO_2$. For example, a passive collection device 100 could use a mild carbonate brine that is converted by a moisture swing sorbent into a bicarbonate brine, which could then be subject to various regeneration schemes of its own, including the possibility of using an electrochemical regeneration.

As a specific example, the sorbent material 110 may be one of a number of anionic exchanges resins that have a strong affinity to $CO_2$ when they are dry, and lose this affinity when they are wet. These are strong base-exchange resins, exemplified by polystyrenes with quaternary ammonium ions attached to the styrene structure. In any event, changing the relative humidity over the resin from 20% to 100%, near room temperature, changes the equilibrium partial pressure over the resin five hundred-fold at any loading. Other embodiments may be designed around sorbents 110 that are regenerated by heat, by vacuum extraction or by regeneration with another chemical.

The sorbent 110 can be selective for a single sorbate or interact with multiple sorbates that cooperate or compete with each other. Sorbents 110 could be autocatalyzing their own absorption. As a specific example, some embodiments may employ sorbents for which the sorbent's affinity to $CO_2$ can be controlled by moisture. In some cases, the presence of moisture will increase the binding of $CO_2$ to the sorbent, while in other cases it will reduce it. One particular class of sorbents, which are known as moisture swing sorbents, bind $CO_2$ under dry conditions and release it again when made wet. Some moisture swing sorbents, as for example, polystyrenes with quaternary ammonium ions, respond strongly to relative humidity. This means that the impact of raising the temperature of the surrounding air increases the loading of the sorbent with $CO_2$ as the associated reduction in relative humidity decreases the Gibbs free energy of sorption more than it is raised by the increase in temperature. However, if warming occurs at a constant relative humidity, for example 100% relative humidity, or wet conditions, then heating the sorbent will drive $CO_2$ off the sorbent. Therefore, moisture swing sorbents can be used with moisture alone, or with a combination of moisture (e.g. liquid water, fog or other droplet forms, vapor, etc.), temperature, and pressure. In some embodiments, the use of such a versatile sorbent may be optimized using algorithms that choose the regeneration pathway based on efficiency in light of ambient conditions, as will be discussed further, below.

Some embodiments making use of a moisture swing sorbent may employ liquid water for regeneration, while other embodiments may use steam. Each regeneration medium has its own advantages and disadvantages. Liquid water has a fast uptake, but is prone to introducing impurities such as salts to the sorbent and system, particularly if the water is sourced from a ground supply. Steam advantageously can be used to provide heating as well as moisture. However, if operating in a low pressure system, the steam may transfer too much heat, and can be difficult to remove. Some embodiments may make use of both steam (which, at low partial pressure is referred to as water vapor) and liquid water. In embodiments without a moisture swing, or embodiments employing a reverse moisture swing, liquid water may not provide any benefit over just using steam.

The heated-moisture-vacuum design used in some embodiments provides many advantages over conventional devices. Specifically, it will make it possible for moisture swing-based $CO_2$ capture devices to be applied in a variety of climes, even including those that experience high levels of humidity and/or cooler weather. The contemplated devices 100 that utilize moisture swing sorbents may be of particular utility in relatively cold and moist climes. However, while the following discussion of various embodiments of the contemplated collection device 100 is done in the context of a heated moisture-based regeneration system, it should be understood that the structures and methods discussed herein may be adapted to other types and forms of sorbents 110, with the appropriate regeneration step being performed in the closed or sealed release chamber 104.

Once the capture structure 106 is fully laden with captured carbon dioxide, it is moved into the release chamber 104 where the $CO_2$ will be retrieved and the sorbent material 110 regenerated in preparation for further collection. According to various embodiments, the collection of captured $CO_2$ and the regeneration of the sorbent material 110 is accomplished after the release chamber 104 has been closed by the placement of a lid 114 over the opening 116. According to various embodiments, the lid 114 (and the capture structure 106) may be lowered onto the opening 116 (and the capture structure lowered into the chamber 104) by some form of actuator 120. In the context of the present description and the claims that follow, an actuator 120 is any device that is capable of affecting movement, and may include, but is not limited to, motors, pistons, hydraulics, screw drives, lifts, rollers, and other devices known in the art. As an option, the actuator 120 may be coupled to the capture structure 106 directly, through the lid 114, or through some other structure. In some embodiments, the actuator 120 may be coupled to the release chamber 104 as well. According to various embodiments, the lid 114 is configured to mate with the release chamber 104, forming a closed chamber. In some embodiments, the lid may form an airtight seal with the release chamber 104.

As shown, the passive collection device 100 also comprises a product outlet 118. The product outlet 118 allows fluid communication between the inside of the release chamber 104 and some structure external to the release chamber 104 (e.g. a storage device, an upgrade system, another release chamber 104, etc.), allowing for the collection of a product stream that is rich in $CO_2$ (e.g. a higher ratio of $CO_2$ to other materials than is present in the ambient air, etc.). In some embodiments, the product outlet 118 may be configured for a gaseous product stream, while in others it may be configured to emit a liquid product stream (e.g. $CO_2$ captured in a brine, etc.).

While the term tile 108 is derived from one possible design where tiles 108 are flat, it is important to note that in the context of the present disclosure, the term tile 108 is intended to accommodate a much broader range of geometries. In some embodiments, tiles 108 are made entirely out of sorbent material, while in others they are made from structural material that hold sorbent material 110 in place. For example, in some embodiments, liquid sorbents (e.g. ionic liquids) may be used by wetting structural surfaces of the tile 108. As a particular example, foam materials may be employed in conjunction with liquid sorbents.

In some embodiments, the tiles 108 may have a circular cross-section (along the central axis of the stack). In other embodiments, other shapes may be employed, including but not limited to, circular approximations (e.g. higher order polygons), triangles, rectangles, squares, hexagons, stars, rings, and the like. While the circular cross-section may be appropriate for use in environments with unpredictable wind direction, in other embodiments, a more oblong tile 108 may be employed in conditions where the wind has a prevailing direction.

Figure 2A:
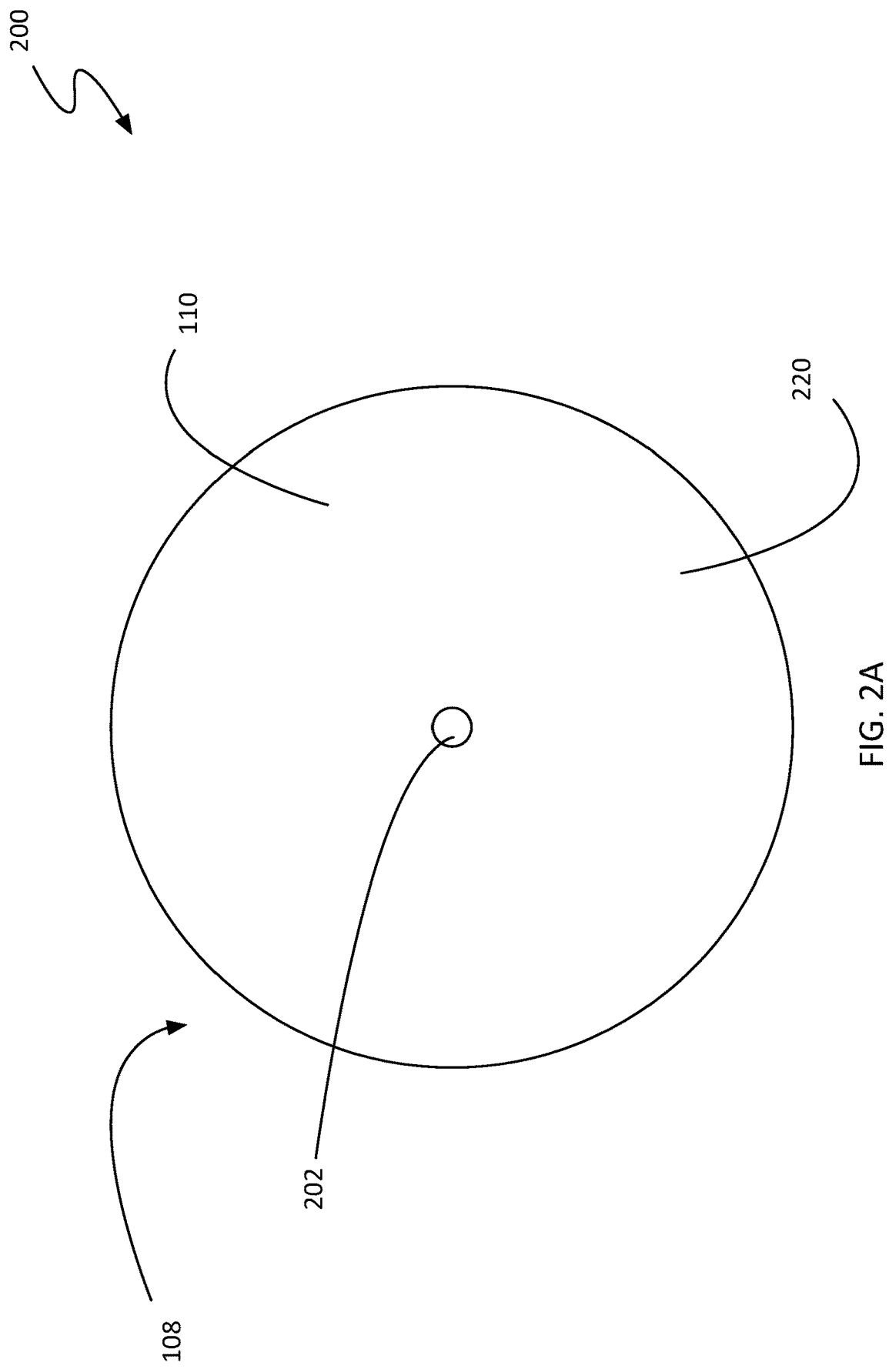
FIG. 2A is a top view of a disk collection tile.
Figure 2B:
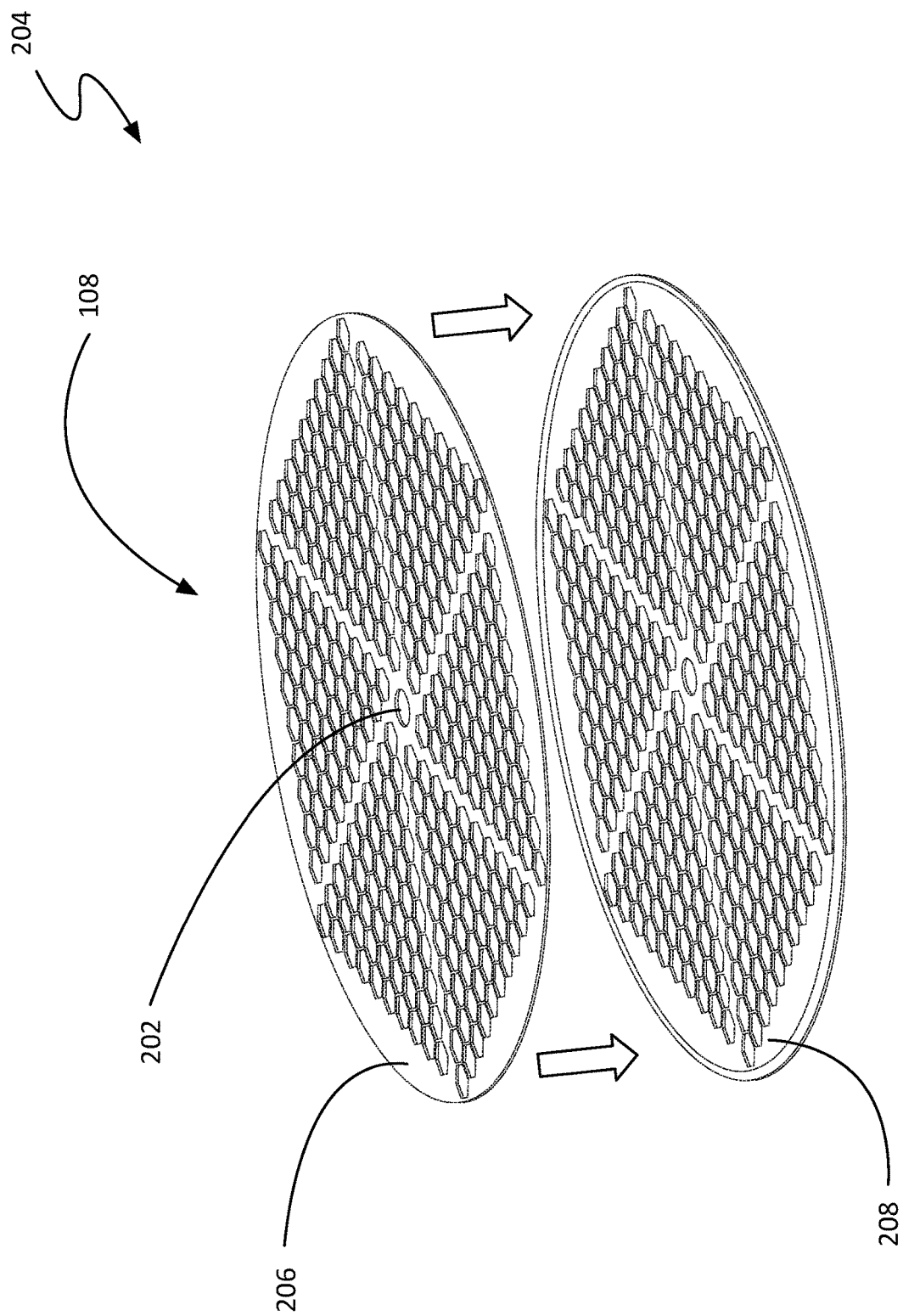
FIG. 2B is a perspective view of a framed collection tile.
Figure 2C:
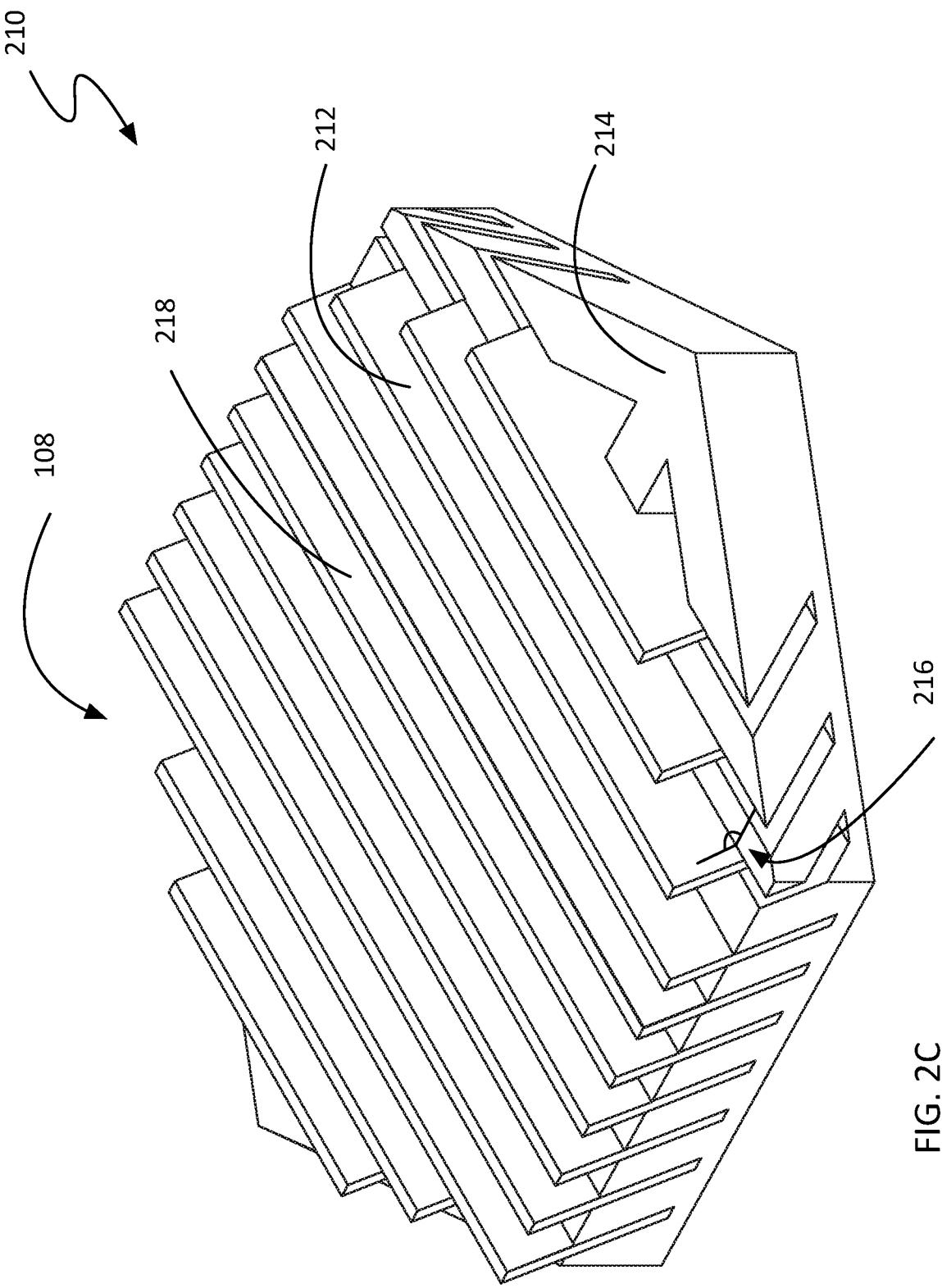
FIG. 2C is a perspective view of a paneled collection tile.

FIGS. 2A, 2B, and 2C show views of non-limiting examples of various tile 108 geometries. FIG. 2A shows a top view of a non-limiting example of a disk-shaped tile 200 having a moisture-swing sorbent material 220. As shown, the disk tile 200 comprises a central aperture 202 through which a collapsible support 112 may pass and couple to each tile 108, and/or through which air may flow.

In some embodiments, the tiles 108 may hang from a structure, such as the lid 114, while exposed to the wind, and rest on each other when lowered into the release chamber 104. The tiles 108 may comprise strengthened pads, rims, or lips, designed to carry the weight of the tiles 108 above, when the stack is in its collapsed form, according to various embodiments. These pads also may extend further in the vertical direction than the more fragile parts of the tile 108 (e.g. sorbents, etc.), so that physical contact between tiles 108 is limited to locations designed to carry this weight. In some embodiments, the tiles 108 (whether circular or with corners) may have the sorbent/resin hung from the tile 108 and maybe in addition to the sorbent laid across the tile 108.

The structure of the tile 108 and the mechanism to hang the tile 108 may be adjusted, based on local geography and weather conditions. For example, in an area of high winds the tile 108 may be substantially more robust and may be completely disconnected from the chamber 104 in order to best insure support. In some embodiments there may be a support structure that collapses or hides during high winds, pulling the sometimes fragile tiles 108 into shelter. The multiplicity of support structure options to raise and lower the tiles 108 simply reflects the variety of needs that may exist for a device that could be placed at nearly any location around the world.

In some embodiments, the tiles 108 may be essentially flat, disregarding any rim or pad used in stacking. In other embodiments, the tiles 108 may be non-planar, such as bowl or helmet shaped. In still other embodiments, the tiles 108 may comprise a framework that can enclose or otherwise secure a sorbent material 110.

FIG. 2B shows a perspective view of a non-limiting example of a framed tile 204 comprising an upper frame 206, a lower frame 208, and a central aperture 202. According to various embodiments, these two frames may be coupled to each other to enclose or sandwich a sorbent material 110, or a material configured to hold a sorbent material 110 (e.g. a foam material to hold a liquid sorbent, etc.), holding it in place while still allowing it to be exposed to air flows. Such a tile 108 may be beneficial for use with sorbent materials 110 that are otherwise too fragile for use as a tile construction material, materials 110 that undergo non-negligible dimensional variation (e.g. expansion, contraction, etc.) when cycling between wet and dry states, or which must be housed in a material that would have limited exposure to air if it was resting on a solid tile such as the disk tile 200 of FIG. 2A.

FIG. 2C is a perspective view of a non-limiting example of a paneled tile 210 comprising a plurality of sorbent surfaces 212 that are made of a heat-swing sorbent material 218. In some embodiments, the tiles 108 may be highly structured to facilitate gas contact with their surface. The tiles 108 may comprise channels or passageways that create gas flow paths from the top to the bottom of a tile 108 to facilitate gas flow that comes in close contact with the sorbent material 110 of the tile 108.

In some embodiments, the tile 108 may be one large sorbent structure. In other embodiments, including the non-limiting example shown in FIG. 2C, the sorbent material 110 may be segmented into slices or surfaces 212 that are individually attached a surface 214 of the paneled tile 210. One such tile could be hexagonal, such as the one shown in FIG. 2C, or a triangular tiling of the surface a tile 108.

To maximize air mixing, the surface of the tile 108 may be variegated, and rough, and adjacent tiles 108 may have different structures nearby. For example, if a tile 108 is made from a number of different tiles, the surfaces vertically on top of each other need not be identical or need not be oriented in the same way. In some embodiments, the sorbent surfaces 212 may be angled with respect to the surface 214 of the tile 210, forming an angle 216.

In some embodiments, the tile 108 may have mounted on it triangular (or some other raised shape) raised sorbents and baffles that increase exposure and also cause turbulence to enhance capture.

Figure 3A:
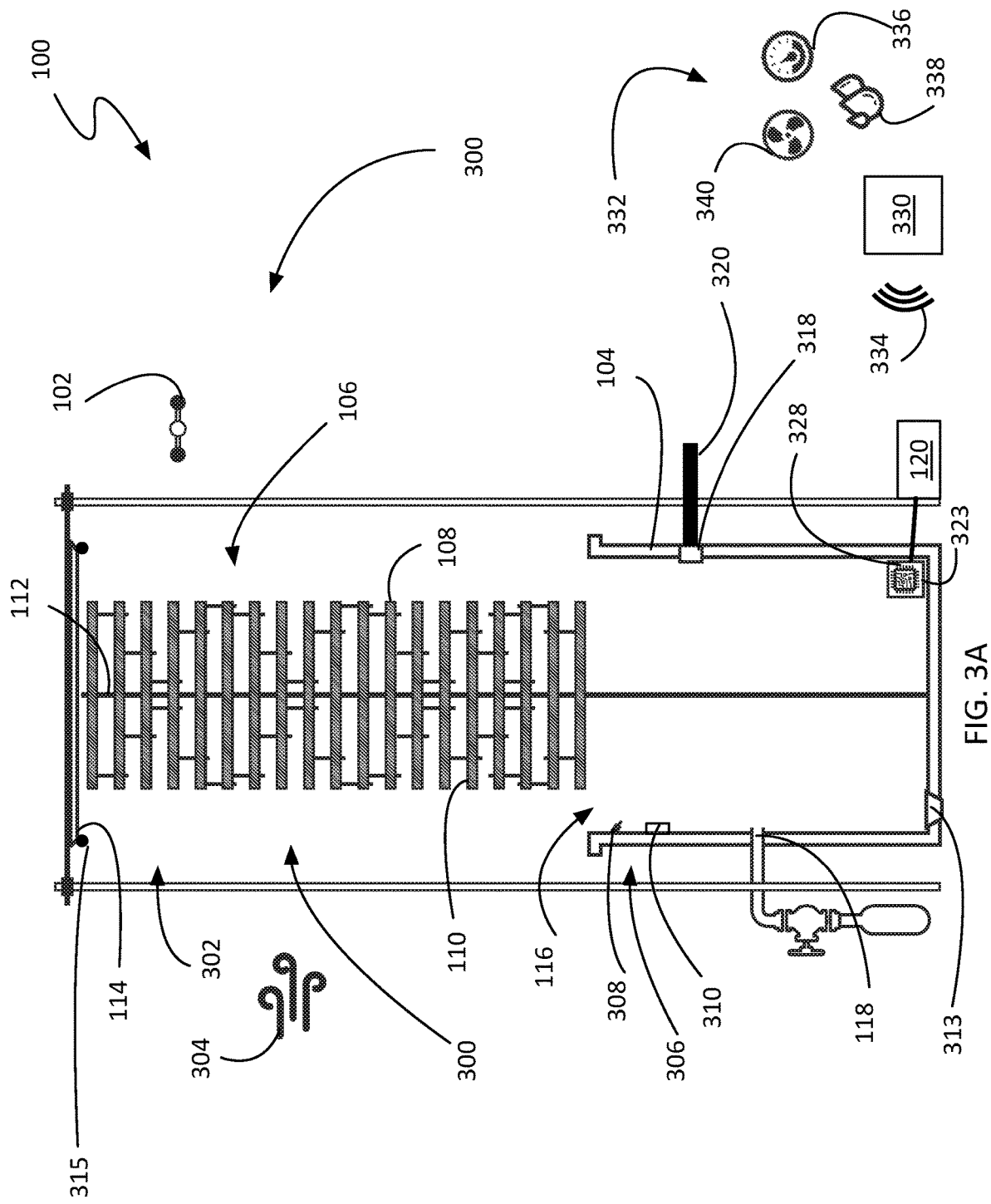
FIG. 3A is a side view of a device for passive collection of atmospheric carbon dioxide, with the capture structure in a collection configuration.
Figure 3B:
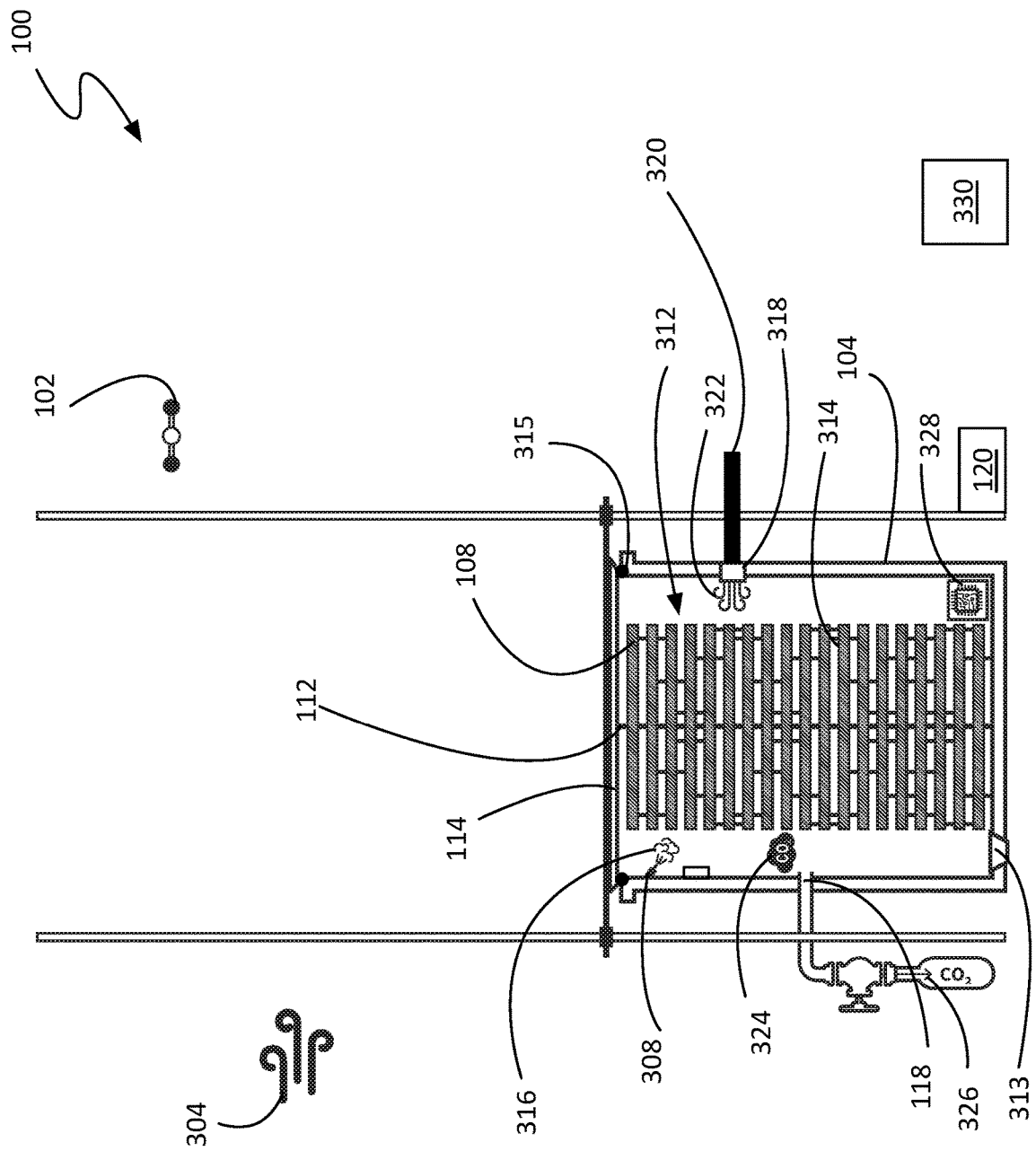
FIG. 3B is a side view of the device of FIG. 3A, with the capture structure in a release configuration.

FIGS. 3A and 3B are side views of a non-limiting example of a collection device 100 with the capture structure 106 in a collection configuration 300 and a release configuration 312, respectively. A portion of the release chamber 104 has been removed to show the inside of the release chamber 104, which includes a sorbent regeneration system 306.

FIG. 3A shows the capture structure 106 is a collection configuration 300, which comprises the capture structure 106 extending upward from the release chamber 104, exposing at least a portion 302 of the capture structure 106 to an airflow 304. According to various embodiments, the ambient air makes contact with the sorbent material 110 of the capture structure 106 through natural air motion (e.g. wind), through induced flows (e.g., thermally induced flows, or flows induced by pressure drops obtained from channeling natural flows), through flows induced by blowers, fans or other mechanical systems, or through a combination of these or other methods known in the art.

As shown, the collection device 100 comprises a sorbent regeneration system 306. In the context of the present description and the claims that follow, a sorbent regeneration system 306 is a system that generates, provides, conducts, or facilitates the medium or energy needed to release captured $CO_2$ and regenerate the sorbent material 110 in preparation for additional $CO_2$ collection. In some embodiments, the sorbent regeneration system 306 may comprise a release medium emitter 308 that emits into the release chamber 104 a release medium appropriate for the sorbent material 110 being used (e.g. mist, liquid water, steam, other chemicals, etc.). In other embodiments, the sorbent regeneration system 306 may comprise a heat source 310 (e.g. for heat swing sorbent materials). In still other embodiments, including the non-limiting example shown in FIG. 3A, the sorbent regeneration system 306 may comprise both a release medium emitter 308 (or multiple emitters) as well as one or more heat sources 310. As a specific example, some embodiments may employ a release medium emitter 308 configured to emit steam into the release chamber 104 thereby providing both moisture and heat and facilitating the use of moisture swing and/or heat swing sorbent materials. In still other embodiments, a heat source 310 may radiate heat provided by steam, with the steam optionally being released into the chamber (e.g. could be configured to provide heat without moisture for some sorbent materials).

FIG. 3B shows the collection device 100 of FIG. 3A with the capture structure 106 in a release configuration 312. In the context of the present description and the claims that follow, the release configuration 312 comprises the capture structure 106 (e.g. the plurality of tiles 108 and the one or more collapsible supports 112) being enclosed within the release chamber 104, in anticipation for the regeneration of the sorbent material 110 and the collection of the captured carbon dioxide 314. As discussed above, the release configuration 312 may further comprises the lid 114 being coupled to, mated with, or sealed to the release chamber 104 such that the chamber 104 is sufficiently closed that the regeneration and collection may be accomplished.

When the capture structure 106, or a portion of the capture structure 106, is laden with $CO_2$ and has been moved into the release chamber 104, the sorbent material 110 is regenerated to release the captured $CO_2$ 314 into the release chamber 104. As previously discussed, this regeneration and release is accomplished by the sorbent regeneration system 140.

The following discussion of the regeneration or release phase of a passive collection device 100 is done in the context of a heat and moisture sensitive sorbent material. However, it should be clear to those skilled in the art that the passive collection device 100, its capture structure 106 and release chamber 104, may be adapted for use with any of the above-mentioned sorbents and their associated regeneration processes. As the introduction of heat and/or a liquid in some form is a common element to the regeneration of many different sorbents, proceeding in the context of heat and moisture is illustrative of other embodiments using other sorbents. Such a discussion should not be interpreted as being limiting.

The regeneration system 306 applies a combination of heat, pressure changes, and/or chemicals (including water) to the sorbent material 110 in order to revert it to its initial state and release $CO_2$. In different embodiments, the $CO_2$-enriched intermediate product can be at different pressures and temperatures, and the $CO_2$ also may only be a fraction of the intermediate product stream.

According to various embodiments, the sealed release chamber 104 may be filled with air, nitrogen, or other sweep gases 322, which may be provided from a sweep gas source 320 through a sweep gas inlet 318. The chamber 104 may also be evacuated, or partially evacuated, so as to remove most background gases. In some embodiments, the release chamber 104 may be evacuated or otherwise prepared before regeneration. The sorbent material 110 loads up on $CO_2$ in the open air, and releases $CO_2$ inside the release chamber 104 after it has been exposed to moisture and/or heat or brought in contact with a chemical. As a result, it is possible to minimize $CO_2$ losses during evacuation or other preparation steps, because the evacuation or these other steps occur before heat and moisture are introduced.

As previously discussed, the sorbent 110 releases the captured $CO_2$ in response to the application of heat and/or moisture, according to various embodiments. Heat can be obtained from various sources. The quality of the heat can be very low, since for most applications the temperatures of the heat source can be well below 100° C. Heat sources may include, but are not limited to, geothermal heat, waste geothermal heat left over after geothermal heat of higher temperature has been applied in some other application, residual heat from power plants and other energy consumers, solar heat, and heat collected from cooling solar panels. Solar heat can be applied, for example, by including a chamber around the release chamber 104 designed to capture solar heat.

In some embodiments, the waste heat generated by a $CO_2$ compression system used in conjunction with the passive collection device 100 output (e.g. product stream 326) may be repurposed for heating the release chamber 104. In other embodiments, the heat may be introduced by delivering the moisture as water vapor that is allowed to condense inside the chamber 104. In other embodiments, the heat may be delivered through heat exchangers. In some embodiments the source of the heat and moisture may be derived from equipment outside of the chamber 104. In other embodiments, the heat source may be built into the release chamber 104. The chamber may have exit points for condensation water as well as for a product stream 326 of enriched gas 324. The $CO_2$ enriched gas 324 is removed from the chamber as a product stream 326 ready for further processing.

In the context of the present description, the release medium 316 is a material or substance that stimulates the release of $CO_2$ from the sorbent material 110. In the case of a moisture swing sorbent material 220, the release medium 316 may be liquid water or steam. In other embodiments, the release medium 316 may be any other solution or substance that is compatible with that particular sorbent material 110. Furthermore, in the context of the present description and the claims that follow, a release medium emitter 210 is a device configured to promote the interaction of the release medium 316 and the $CO_2$-laden sorbent material 110. Exemplary release medium emitters 210 include, but are not limited to, misters, nozzles, foggers, liquid jets, a reservoir of release medium through which the sorbent passes, steam nozzles, and the like.

The use of steam as a release medium 316 present certain advantages over other release mediums 316, as it may be used with some thermal swing sorbent materials in addition to moisture swing sorbents. The steam transfers heat to the sorbent, and additionally suppresses water extraction.

In embodiments where the release medium 316 takes a liquid form, either when being applied through an emitter 210 or after application (e.g. steam condensing into liquid water upon cooling, etc.), the sorbent regeneration system 306 may further include one or more liquid extractors 313, which are devices and/or structures configured to collect the liquid release medium 316 and remove it from the chamber 104 after it has stimulated the $CO_2$ release, either for disposal, immediate reuse, conditioning in preparation for reuse (e.g. removing impurities, etc.), or as a $CO_2$ storage medium. Additionally, embodiments making use of water vapor as a release medium 316 may also comprise one or more liquid extractors 313 for the removal of liquid water produced by condensation inside the chamber.

The liquid extractor 313 comprises a drain at the bottom of the chamber 104 that may be coupled to a release medium reservoir through a pump. Collected liquid water may be returned to the reservoir by the pump for repeated use, reducing the overall water requirements for operating the collection device 100 and making it usable in environments with reduced water availability.

In some embodiments, the product stream 326 may be formed by displacing the enriched gas 324 with a sweep gas 322 introduced to the inside of the release chamber 104. In some embodiments, the sweep gas 322 is atmospheric air, while in others the sweep gas 322 is another readily available gas.

Some embodiments may employ steam as a sweep gas 322, which may provide certain advantages. The use of steam provides an avenue for temperature manipulation within the regeneration chamber. Pumping in steam may increase the temperature, while pumping it out can deliberately cool the chamber and its contents. Furthermore, the use of a water saturated sweep gas such as steam (which at low partial pressure is referred to as water vapor) advantageously will keep moisture-swing sorbents from releasing water, which may increase the overall efficiency of the device 100.

As mentioned above, in some embodiments it is possible release the captured $CO_2$ 314 from the sorbent 110 into an aqueous solution that has sufficient alkalinity to store $CO_2$. Examples are sodium carbonate or potassium carbonate solutions that can have rich levels of bicarbonate that are in equilibrium with a few percent of $CO_2$ over the solution. In effect, the solution brought in contact with the material 110 drives the moisture swing, but then contains the $CO_2$.

As a specific example, in an embodiment making use of an anionic exchange resin, quaternary ammonium ions form a strong-base resin, in which the positive ions a fixed to the polymer matrix while the negative ions, hydroxides (OH—), are free to move. As the dry resin loads up with carbon dioxide, the hydroxide ions become bicarbonate (OH—+ $CO_2 \rightarrow HCO_3$). Once laden, the resin is enclosed in the release chamber 104, where it is wet down. The wet resin releases $CO_2$ and unload to carbonate ($2HCO_{3-} \rightarrow CO_{3--} + CO_2 + H_2O$). Ion hydration drives $CO_2$ affinity ($CO_{3--} + H_2O \rightarrow HCO_{3-} + OH$—) while equilibrium is driven by the water content. The $CO_2$ laden liquid may then be removed from the chamber 104 for processing elsewhere, or continued storage.

In some embodiments, air can be removed from the chamber 104 prior to releasing the $CO_2$, in order to raise the fraction of the gas stream that comprises $CO_2$. Options may include application of a vacuum along with either heat and/or moisture. Furthermore, the moisture may be introduced as $H_2O$ or other substances, or $H_2O$ with an additive.

In some embodiments, the release chamber 104 may be at least partially evacuated during the regeneration or release phase. In these embodiments, it becomes important that the seal between the lid 114 and the release chamber 104 minimizes gas leaks to the inside. To this end, there may be a gasket 315 between the lid 114 and the top of the chamber 104. Attaching the gasket 315 to the bottom of the lid 114 may help protect it against accumulation of dirt. In some embodiments, the seal is further improved by having a rim around the edge of the lid 114 that when the lid 114 is closed, there is a narrow trough around the edge of the lid 114. This trough could be filled with water, which effectively would prevent air from entering the closed chamber 104, and leaks would be easily detected. Residual flows into the chamber 104 would be largely curtailed because the resistance to flow is much larger for a liquid than for air.

During the regeneration of the sorbent 110, the $CO_2$ partial pressure is raised above ambient levels. In embodiments where the release chamber 104 is substantially evacuated, then the water vapor present can act as the sweep gas 322. This in turn implies that for the gas to flow from one chamber 104 to another, the temperature (and with it the water vapor pressure) needs to be adjusted from the channel the sweep gas 322 enters, to the channel through which the sweep gas exits. At a minimum, the temperature change must compensate for the pressure increase in $CO_2$ that occurs during the regeneration process.

In some embodiments, such as those where the release chamber 104 has the shape of a vertically aligned drum, a combined flow pattern could send the gas axially along an opening in the center of the capture structure (e.g. aperture 202 of disk tile 200, etc.), returning back along an annular region along the cylindrical wall of the chamber 104, and have at every horizontal level in the chamber 104 air flow radially from the center flow to the flow in the outside annulus. In such embodiments, the flow in the vertical sections sees very little flow resistance, whereas the radial connections dominate the flow impedance. As a result, each level sees the same pressure drop and thus will experience similar flow rates. The impedance to the flow can be maintained by creating walls with small openings around the inside flow cylinder and the outside flow path through the annulus. Other options include flows that move axially through main part of the chamber 104 and return through an annular cap between the sorbent stack material and the wall of the chamber 104.

In some embodiments, the released $CO_2$ may be gathered into a gas stream that flows through the release chamber 104. The gas may be recirculated over the sorbent by mechanical means. This gas could be dominated by water vapor and carbon dioxide, or contain most components of air, it also could include pure nitrogen, or any other gas chosen as a sweep gas 322. Furthermore, air flow through the chamber may be controlled by a pump, fan, or blower that introduces the heated air to the sorbent and another fan that extracts $CO_2$ rich air from the chamber.

In some embodiments, a mechanically driven heated gas stream flows over the sorbent and, with the help of moisture and heat, induces the release of $CO_2$ from the sorbent at a partial pressure that significantly exceed those in ambient air. Higher partial pressures are most desirable. Pressures that have been achieved in similar chambers range from 0.1 kPa to 8 kPa, according to various embodiments.

After the $CO_2$ has been released from the sorbent material 110 of the capture structure 106 inside the chamber 104, it mixes to form an enriched gas 324. According to various embodiments, the enriched gas 324 is subsequently removed from the chamber 104 through a product outlet 118 as a product stream 326. In some embodiments, the product outlet 118 may be a valve, while in others it may comprise a pump. The product outlet 118 is in fluid communication with the inside of the release chamber 104.

As shown, the collection device 100 further comprises a control system 328. According to various embodiments, the control system 328 is responsible for the cyclical operation of the collection device 100. In the context of the present description and the claims that follow, the control system 328 is a device capable of executing a series of predefined instructions to cause the collection device 100 to operate in a cyclical manner, capturing $CO_2$ from the atmosphere and releasing it within the release chamber 104. Examples include, but are not limited to, embedded systems, conventional computer systems, mobile devices, and the like. The control system 328 is communicatively coupled with the various components that either provide information (e.g. sensors, etc.) or perform actions (e.g. actuator 120, the sorbent regeneration system 306, etc.). In some embodiments, the control system 328 may be responsible for additional functions. In some embodiments the control system 328 may provide automation for the collection device 100 that allows it to run unattended.

The collection devices 100 may further comprise one or more sensors 330 (e.g. $CO_2$ sensors, humidity sensors, temperature sensors, air flow sensors, light sensors, etc.) coupled to a processor configured with algorithms for efficient operation of the device 100. The passive collection device 100 may further comprise actuators 120 or other means of performing mechanical work, for the raising and lowering of the capture structure 106. The passive collection device 100 may also comprise communication equipment for remote monitoring and operation. In some embodiments, the passive collection device 100 may be configured for autonomous operation, adapting to ambient conditions 332 as needed. Power may be supplied directly, via battery, or from a renewable source such as, for example, solar, wind, or thermoelectric.

According to various embodiments, one or more measurements may be performed using the sensors 330, with the signals 334 being observed by the control system 328. These measurements may include, but are not limited to, wind speed and other weather data, humidity both internal to the chamber and external, time, $CO_2$ off-take gas percentage, internal temperature of the chamber 104, flow speeds (to detect blockages), operational failure of components and/or instability during operation, external and internal temperatures, and the like. Using this information, the control system 328 may be configured to perform one or more operations in response to detected ambient conditions or internal conditions. These operations may include, but are not limited to, instructions to lower the tiles 108 due to high winds or excessive moisture, timed instructions to raise or lower the tiles 108 to vary exposure time, starting, stopping, increasing or decreasing flow rates, extend or reduce time in the release chamber 104 depending on $CO_2$ loading, and the like.

In some embodiments, the passive collection device 100 may be configured to adjust the delivery of heat and moisture to adapt to specific circumstances or ambient conditions 332, like temperature 336, humidity 338, and/or wind sped 340. For example, during a hot dry day in the desert, the performance of the device 100 may be optimized without the use of additional heat, whereas during night hours when the relative humidity increases, it may be advantageous to heat the gas recirculating in the release chamber 104. This adjustment during collection and/or release may be enhanced through the application of artificial intelligence into the control systems, in some embodiments.

Some embodiments of the passive collection device 100 may employ algorithms developed to produce the best response from the sorbent 110. These algorithms are designed to combine heating and moisture applications in an efficient manner. These algorithms optimize the balance between performance and operational cost, so that water and heat are deployed to optimize $CO_2$ delivery at an optimal rate and optimal partial pressure. According to various embodiments, optimization may account for ambient temperatures, the loading state of the sorbent 110, weather conditions, the cost of heat and water, and other relevant parameters. In some embodiments the temperature of release of $CO_2$ in the chamber 104 may be targeted to be elevated over the ambient temperature. The optimal temperature depends on environmental conditions and the heat tolerance of the material in question, and could also be affected by the cost of the available heat. In a specific embodiment, the range is between ambient temperatures and 150° C., but may be preferable to operate in a range between 45 and 50° C., depending on the sorbent. For many sorbents, this temperature range is still sufficient, and the cost of the heat is relatively small. The sorbent 110, once saturated in water and heated up, will release the $CO_2$ into the confined volume of the release chamber 104.

According to various embodiments, the control system 328 may further comprise, or be instructed by, an artificial intelligence system 317 (AIS) that observes the performance of the device 100 and adapts its performance in an iterative fashion to maximize output, and to learn optimizations which will differ with weather conditions and the physical state of the device 100. This AIS 317 will improve efficiency, reduce energy costs and reduce maintenance. For example, the AIS 317 coupled to the device's 100 control system 328 may "learn" that certain alarms are not critical and will adjust and provide notice to the operation of the particular alarm. Reduction of alarms that require response would be a major contributor to reduced operational costs.

The control system 328 may make use of software configured to control one or more operations or properties, including but not limited to the rate of addition of water in the form of liquid/fog/steam, internal temperature, flow rate of sweep gas, pumping rate to pull product gas out, timing of exposure to air, time within release chamber 104, and the like. The software may be configured to optimize various properties, such as yield, water consumption, and/or energy consumption.

Automated system may further include, but are not limited to, wind/weather measurement and response, $CO_2$ collection monitoring, automatically timed movement of the capture structure 106 and/or support structure 108, water and air control systems, temperature measurement & control, internal flow measurement, timing controls to match the function of other system, and the like.

In some embodiments, the passive collection device 100 may further comprise a series of baffles to modify airflow and/or shelter various aspects of the device 100. In the context of the present description and the claims that follow, a baffle is a structure having at least one surface that at least partially obstructs air flow, allowing it to redirect or focus air flow. Some baffles may also at least partially obstruct light, and may be used to shelter sensitive sorbent materials. Examples include, but are not limited to, sails, walls, fins, wings, and the like. Some baffles may be rigid, while others may be flexible, or comprise a flexible surface mounted on a rigid frame. Some embodiments may use baffles to introduce or enhance turbulence in local air currents, to increase exposure to the sorbent materials.

According to various embodiments, baffles may be employed in a variety of contexts. In some embodiments, one or more baffles may be used external to a capture device 100. See, for example, the baffles 408 shown in FIG. 4, which will be discussed further, below. In other embodiments, one or more baffles may be implemented within, or as a part of, a capture device 100. For example, in one embodiment, the tiles 108 may have one or more baffles above and around a central aperture 202 to promote and/or control airflow. In another embodiment, baffles may be used on the tiles 108 to protect the sorbent material 110 from exposure to damaging UV light. Additionally, baffles may be used on the tiles 108 such that, when the capture structure 106 is in the collection configuration 300, air turbulence is increased, and airflow is directed at the sorbent 110.

In some embodiments, the baffles may be articulated, and may further be mechanized and programmatically movable to respond to different ambient conditions. In some embodiments, there may be baffles within the chamber 104, at the bottom and along the sides, to enhance air flow and moisture distribution. In other embodiments, however, the passive collection device 100 may not employ baffles at all.

Passive collection devices 100 may stand alone, or they may be the backbone of a larger air capture system, such as a passive collection cluster 402 made up of two or more integrated collection devices 100, or a passive collection system 400 comprising at least one cluster 402. A complete passive collection system 400 could be built around two collection devices 100 or may comprise a complex interconnected network of thousands of collection devices 100. In one embodiment, an interconnected system of 5 to 20 collection devices 100 makes a passive collection cluster 402, while in other embodiments a cluster 402 may simply be two devices 100 working in harmony. In some embodiments, passive collection clusters 402 may be skid mounted blocks that comprise a self-contained system but that may also be field erected.

Figure 4:
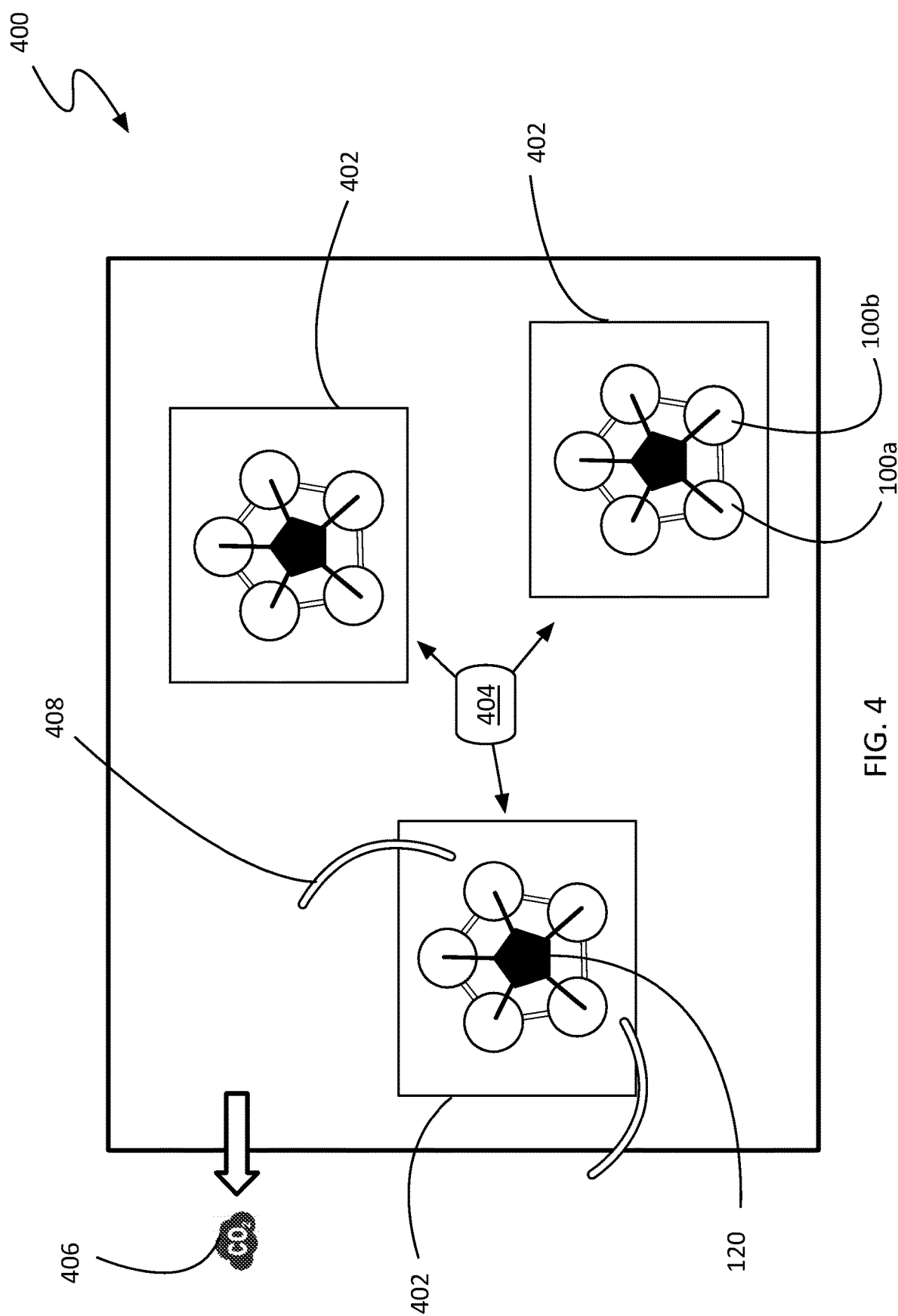
FIG. 4 is a schematic view of a system for passive collection of atmospheric carbon dioxide comprising multiple passive collection clusters.

FIG. 4 is a schematic view of a system 400 for passive collection of atmospheric carbon dioxide comprising multiple passive collection clusters 402. In the context of the present description, a passive collection system 400 is a combination of collection devices 100, or single collection devices with associated hardware, connections, control systems and software for internal processing and additional equipment, control systems and software to post process the output of the collection devices 100, and the like. For the sake of differentiating a system 400 from a cluster 402, a system 400 is made up of at least one cluster 402, but a cluster 402 is made up of at least two devices 100. Furthermore, a passive collection system 400 is a set of collection devices 100 that are particularly tightly connected, and organized in one or more clusters 402. For example, they could be tied together in a single skid-mounted containerized subsystem. The use of the term system and cluster partially overlap. Passive collection clusters 402 are typically more tightly connected than passive collection systems 400.

Collection devices can be interconnected into a passive collection system 400 that, by coordinating regeneration, can create a nearly continuous product stream 406. This continuous product stream 406 can be enhanced by sweeping product gas from nearly empty units through units that still show higher loading. For example, in one embodiment, a collection device 100a in a cluster 402 may be nearly empty, and have its product gas swept into a neighboring collection device 100b (in the same cluster 402) that has a higher loading. Devices 100a and 100b are in fluid communication with each other (e.g. device 100b is in fluid communication with the product outlet 118 of device 100a), and in a sense share a sweep gas source.

The use of a passive collection system 400 or cluster 402 may provide a continuous product stream 406, which is flexible and can adjust to varying weather and climate conditions. In some embodiments, the system 400 and/or cluster 402 may comprise a control system 404, which may be in place of, or operate along side of, the control system 328 of individual devices 100. The control system 404 may be configured to operate devices in series to cause the continuous operation of such a system 400, making it possible to efficiently upgrade $CO_2$ from 400 parts per million as is typical for ambient air, to several percent, ranging from 1 to 10%. The advantage of the systems and methods contemplated herein is that they can minimize energy cost and operate optimally under varying conditions. It should be noted that the control system 404 of a cluster 402 or system 400 may perform all of the operations and measurements contemplated for the control system 328 of an individual device 100, as discussed above.

In some embodiments, the individual collection devices 100 of a passive collection system 400 may be held in place by various means and interconnected in a way that makes it possible to enriched gas 324 from one passive collection device 100 through a sequence of collection devices 100 that are regenerating. The gas handling, water, steam or power handling connections may be switched as needed between all or subsets of the collection devices 100. As an option, collection devices 100 can be organized in a hierarchical structure of individual collection devices 100, clusters 402 of collection devices 100, clusters of clusters, systems of cluster, and so forth.

A passive collection system 400 may comprise a system of process units to flow sweep gas through the collection devices 100, or alternatively a system of process units to evacuate collection devices 100 and pull $CO_2$ out of them. These process units may include piping, pumps, fans, valves, sensors, actuators, control software and other components necessary for the interconnection of the collection devices 100. Furthermore, the passive collection system 400 may include a system of piping and valves to deliver water to the collection devices 100, to recover waste water, and/or to recover and recirculate water.

Some passive collection systems 400 and/or clusters 402 may comprise shared resources. For example, as shown in FIG. 4, in some embodiments multiple passive collection devices 100 may share the same actuator 120 to move their respective capture structures 106 between the collection configuration 300 and the release configuration 312. This actuator 120 may be shared between multiple devices 100 using mechanical devices like gears, arms, pulleys, and/or any other mechanical device known in the art.

In some embodiments, a passive collection system 400 may comprise a shared system for delivery of release medium 316 to multiple collection devices 100, while in others, each passive collection device 100 may have its own source. Passive collection systems 400 may also comprise support structures that hold multiple collection devices 100 in place. The support structures may include, but are not limited to, foundations, tent like structures to hold up the superstructure for lifting and lowering the capture structures 106, protection against sunlight, and panels to guide the wind in various ways through the system.

As shown in FIG. 4, in some embodiments, a passive collection system 400 may further comprise one or more baffles 408 to redirect air currents for increased exposure to the sorbent materials of the capture devices 100. In some embodiments, these baffles 408 may be articulated, and may be configured to adjust to changes in ambient conditions (e.g. wind direction, position of the sun in the sky, weather, etc.). Those skilled in the art will recognize that baffles 408 may also be employed in the context of individual capture devices 100 in the same way.

Additionally, some passive collection system 400 and/or clusters 402 may employ automated systems. Automated system may include, but are not limited to, wind/weather measurement and response, $CO_2$ collection monitoring, automatically timed movement of the tiles 108 and lid, water and air control systems, temperature measurement & control, internal flow measurement, timing controls to match the function of other collection devices 100 in the same system or cluster, blow down control, and any other automations contemplated herein for individual devices 100.

The following discussion is meant to exemplify rather than limit the operation of a passive collection device 100 employing sorbent tiles 108 sensitive to heat and moisture, according to one embodiment. The passive collection device's 100 working cycle begins from a closed position with all sorbent tiles 108 inside the release chamber 104 and empty of $CO_2$. (Empty in this context means lean; there may be residual $CO_2$ on the sorbent, or the sorbent even in the fully empty state contains $CO_2$, for example as carbonate, if the sorbent swing is between carbonate and bicarbonate.) The lid is pulled up by an actuator 120, raising all tiles 108 that move from the chamber, where one tile 108 rests on the next, to a collection configuration 300 where the tiles 108 all hang from at least one collapsible support 112. When the lid 114 reaches the topmost position, all sorbent tiles 108 are exposed to air movement. A gap exists between the tiles 108 so that air can flow across all tiles 108, starting the capture phase. Based on the climatic conditions and the sorbent choice, the exposure time of the $CO_2$ capture phase can vary. In the case of a humidity swing, the tiles 108 will release some moisture and bind $CO_2$. The same might be the case for other sorbents that were exposed to moisture during regeneration. One reason to expose sorbent to moisture (for example in the form of mild steam) is to prevent it from unloading water at a great energy expense. This is different from a moisture swing where the presence of water by itself stimulates the release of $CO_2$.

After exposure, the lid 114 is lowered again. As soon as the lid closes the release chamber 104, collection begins. In the example of a moisture swing sorbent, the sorbent tiles 108 bind enough moisture to cause $CO_2$ release. The air in the chamber is now enriched with $CO_2$, which is pulled out through a product outlet 118. Once the tiles 108 have been emptied, they are raised again, and as the sorbent 110 dries it will again begin the cycle of collecting $CO_2$ from air. Water that condenses is either pumped back in to the heat sink or it is flushed out. To avoid the gradual decline in the $CO_2$ concentration in the product stream 326, it is possible to gang together a number of collection devices 100, where the sweep gas from a nearly empty passive collection device 100 enters a passive collection device 100 with a still higher equilibrium concentration of $CO_2$. The product stream 326 delivered in such a manner is close in concentration to that of a nearly loaded resin.

In some embodiments the device 100 or a cluster 402 of collection devices 100 may be raised above other equipment. This will be done either to reduce the footprint and land use and/or to enhance collection as in some geographies having the collection higher will increase air flow.

In some embodiments, the passive collection system 400 may include panels for wind guidance. The purpose of these panels or sail like structures is to guide wind either to or away from a passive collection device 100 so as to increase the operating range of a passive collection device 100 with regard to wind speeds. At low wind speed air would be funneled to the passive collection device 100, at high wind speed it would be deflected away. Said panels may also be used with single collection devices 100, outside the context of a system 400 or cluster 402.

According to various embodiments, a passive collection system 400 also comprises electrical, sensor and control systems that power and manage the collection devices 100. Some passive collection systems 400 also comprise an upgrade system for improving the quality of the product stream 326. In some embodiments, passive collection systems 400 may be configured to deliver a dry $CO_2$/air mixture with $CO_2$ concentrations ranging from 0.1% to 95% or higher. Some passive collection systems 400 may employ a system to bind $CO_2$ to a second sorbent from which pure $CO_2$ may be produced. Other passive collection systems 400 may use a system that starts from a low-pressure stream of what amounts to nearly pure $CO_2$ and water vapor, which is then dried and compressed so as to produce a pure concentrated stream of $CO_2$. In still other passive collection systems 400, a system that dissolves $CO_2$ into a carbonate/bicarbonate solution may be used. Some passive collection systems 400 may make use of multiple systems for upgrading system output. However, it should be clear to those skilled in the art that collection devices 100 and systems 400 are designed to collect $CO_2$ from the atmosphere and present it in a form useful for a downstream application. They are in no way limited by the choice of sorbent material or the intended downstream application.

Where the above examples, embodiments and implementations reference examples, it should be understood by those of ordinary skill in the art that other passive collection devices, systems and methods and examples could be intermixed or substituted with those provided. In places where the description above refers to particular embodiments of passive collection devices, systems, and methods, it should be readily apparent that a number of modifications may be made without departing from the spirit thereof and that these embodiments and implementations may be applied to other carbon dioxide collection devices, systems, and methods as well. Accordingly, the disclosed subject matter is intended to embrace all such alterations, modifications and variations that fall within the spirit and scope of the disclosure and the knowledge of one of ordinary skill in the art.

What is claimed is:

1. A device for passive collection of atmospheric carbon dioxide, comprising:
 a release chamber comprising an opening and a sorbent regeneration system;
 a capture structure coupled to the release chamber and comprising at least one collapsible support and a plurality of tiles coupled to and spaced along the at least one collapsible support, each tile comprising a sorbent material, and the capture structure being movable between a collection configuration and a release configuration;
 a lid covering the opening of the release chamber when the capture structure is in the release configuration; and
 a product outlet in fluid communication with the inside of the release chamber and configured to receive a product stream of enriched gas;
 wherein the collection configuration comprises the capture structure extending upward from the release chamber to expose at least a portion of the capture structure to an airflow and allow the sorbent material of the plurality of tiles to capture atmospheric carbon dioxide;
 wherein the release configuration comprises the at least one collapsible support of the capture structure being collapsed, the lid covering the opening of the release chamber, and the plurality of tiles being sufficiently enclosed inside the release chamber that the sorbent regeneration system may operate on the plurality of tiles to release captured carbon dioxide from the sorbent material and form an enriched gas within the release chamber.

2. The device of claim 1, wherein the sorbent material is a moisture swing sorbent material, the sorbent regeneration system comprises a release medium, and a release medium emitter, and wherein the release medium is one of liquid water and steam.

3. The device of claim 1, wherein the sorbent material is a heat swing sorbent material and the sorbent regeneration system comprises a heat source.

4. The device of claim 3, wherein the heat source is a release medium emitter configured to release steam.

5. The device of claim 1, wherein the release chamber further comprises a sweep gas inlet coupled to a sweep gas source and configured to introduce a sweep gas to the release chamber to displace the enriched gas.

6. The device of claim 1, wherein each tile of the plurality of tiles is substantially planar.

7. The device of claim 6, wherein the sorbent material for each tile of the plurality of tiles comprises a plurality of sorbent surfaces coupled to a surface of the tile at an angle greater than zero.

8. The device of claim 1, wherein each tile of the plurality of tiles comprises an aperture.

9. The device of claim 1, wherein each tile of the plurality of tiles comprises an upper frame and a lower frame, with the sorbent material sandwiched between the upper frame and lower frame.

10. The device of claim 1, further comprising:
an actuator coupled to the capture structure;
a control system communicatively coupled to the actuator and configured to drive the actuator to move the capture structure between the collection configuration and the release configuration.

11. The device of claim 10, further comprising:
at least one sensor communicatively coupled to the control system;
wherein the control system is configured to determine at least one ambient condition based on signals received from the at least one sensor, and autonomously drive the actuator to move the capture structure between the collection configuration and the release configuration based upon the at least one ambient condition;
wherein the at least one ambient condition comprises at least one of a temperature, a humidity, and a wind speed.

12. The device of claim 1, further comprising at least one baffle.

13. A method for passive collection of atmospheric carbon dioxide, comprising:
preparing a passive collection device, comprising a release chamber and a capture structure, to collect atmospheric carbon dioxide by moving the capture structure into a collection configuration with an actuator driven by a control system, the capture structure comprising at least one collapsible support and a plurality of tiles coupled to and spaced along the at least one collapsible support, each tile comprising a sorbent material, the collection configuration comprising the capture structure extending upward from the release chamber;
exposing at least a portion of the capture structure to an airflow to allow the sorbent material of the plurality of tiles to capture atmospheric carbon dioxide;
placing the capture structure in a release configuration by driving the actuator to lower the capture structure into the release chamber such that the at least one collapsible support collapses and the plurality of tiles is entirely inside of the release chamber;
closing the release chamber with a lid, confining the plurality of tiles inside the release chamber;
regenerating the sorbent material of the plurality of tiles by operating on the sorbent material with a sorbent regeneration system to release the captured carbon dioxide, forming an enriched gas within the release chamber; and
emitting a product stream of enriched gas through a product outlet in fluid communication with the inside of the release chamber by displacing the enriched gas with a sweep gas introduced to the release chamber.

14. The method of claim 13, wherein the sorbent material is a moisture swing sorbent material, the sorbent regeneration system comprises a release medium, and a release medium emitter, and wherein the release medium is one of liquid water and steam.

15. The method of claim 13, further comprising:
determining at least one ambient condition local to the passive collection device based on a signal received from at least one sensor communicatively coupled to the control system; and
determining an optimal exposure time for the capture structure based on the at least one ambient condition.

16. A system for passive collection of atmospheric carbon dioxide, comprising:
at least one passive collection cluster, each passive collection cluster comprising at least two passive collection devices, each passive collection device comprising:
a release chamber comprising an opening and a sorbent regeneration system;
a capture structure coupled to the release chamber and comprising at least one collapsible support and a plurality of tiles coupled to and spaced along the at least one collapsible support, each tile comprising a sorbent material, and the capture structure being movable between a collection configuration and a release configuration;
a lid covering the opening of the release chamber when the capture structure is in the release configuration;
an actuator coupled to the capture structure; and
a product outlet in fluid communication with the inside of the release chamber and configured to receive a product stream of enriched gas;
a control system communicatively coupled to each passive collection cluster and configured to drive the actuator to move the capture structure of at least one passive collection device between the collection configuration and the release configuration;
wherein the product outlet of each passive collection device within the same cluster is in fluid communication;
wherein, for each passive collection device, the collection configuration comprises the capture structure extending upward from the release chamber to expose at least a portion of the capture structure to an airflow and allow the sorbent material of the plurality of tiles to capture atmospheric carbon dioxide;

wherein, for each passive collection device, the release configuration comprises the at least one collapsible support of the capture structure being collapsed, the lid covering the opening of the release chamber, and the plurality of tiles being sufficiently enclosed inside the release chamber that the sorbent regeneration system may operate on the plurality of tiles to release captured carbon dioxide from the sorbent material and form an enriched gas within the release chamber.

17. The system of claim 16, wherein the at least two passive collection devices of each cluster share the same actuator.

18. The system of claim 16, wherein the release chamber of each passive collection device in the same cluster is in fluid communication, such that the enriched gas of one collection device may be swept through the release chamber of a neighboring collection device.

19. The system of claim 16, further comprising:
at least one sensor communicatively coupled to the control system;
wherein the control system is configured to determine at least one ambient condition based on signals received from the at least one sensor, and autonomously drive at least one actuator to move at least one capture structure between the collection configuration and the release configuration based upon the at least one ambient condition;
wherein the at least one ambient condition comprises at least one of a temperature, a humidity, and a wind speed.

20. The system of claim 19, wherein the control system is configured to operate the passive collection devices in series to produce a continuous product stream of enriched gas.

* * * * *